UNITED STATES PATENT OFFICE.

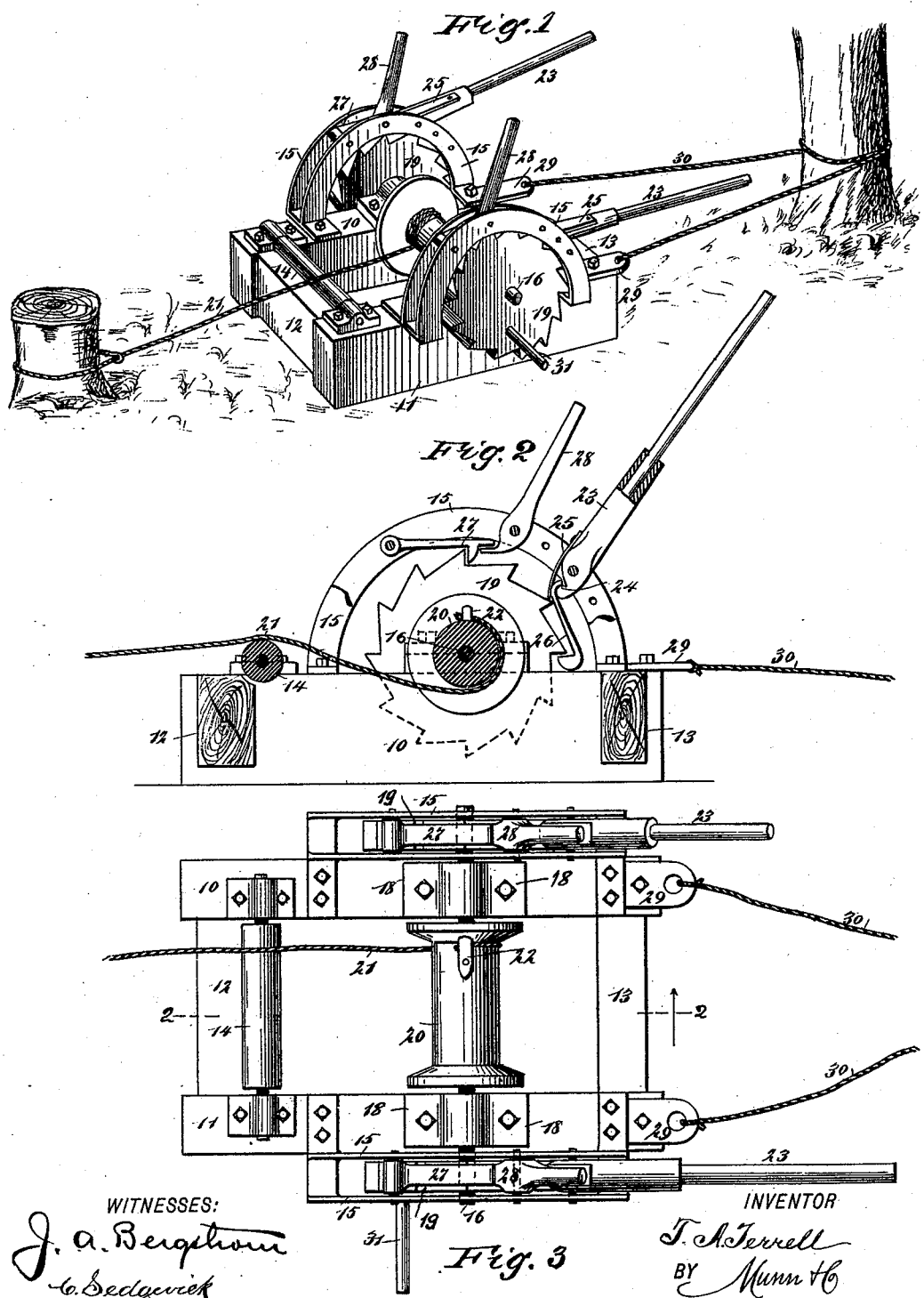

THOMAS A. TERRELL, OF NEW WHATCOM, WASHINGTON.

STUMP-PULLER.

SPECIFICATION forming part of Letters Patent No. 498,090, dated May 23, 1893.

Application filed January 18, 1893. Serial No. 458,751. (No model.)

*To all whom it may concern:*

Be it known that I, THOMAS A. TERRELL, of New Whatcom, in the county of Whatcom and State of Washington, have invented a new and Improved Stump-Puller, of which the following is a full, clear, and exact description.

My invention relates to an improvement in stump pullers, and has for its object to provide a machine of that kind which will be simple, comprising but few parts, and which will also be exceedingly durable.

Another object of the invention is to provide a stump puller capable of being readily transported from place to place, and of being expeditiously and conveniently manipulated.

The invention consists in the novel construction and combination of the several parts, as will be hereinafter fully set forth and pointed out in the claims.

Reference is to be had to the accompanying drawings forming a part of this specification, in which similar figures of reference indicate corresponding parts in all the views.

Figure 1 is a perspective view of the machine. Fig. 2 is a central vertical longitudinal section through the machine, taken practically on the line 2—2 of Fig. 3; and Fig. 3 is a plan view of the machine.

The frame of the machine comprises two side beams 10 and 11, which are connected by front and rear beams 12 and 13. These beams are of a solid character, and are adapted to rest upon the ground. Upon the front portion of the side beams a friction roller 14, is journaled, and each side beam between its ends carries a segmental frame 15. This frame ordinarily comprises two segmental bars which are held some distance apart by suitable braces, and the two arched or segmental members of each frame are connected, and are so bolted or otherwise fastened upon the upper portion of the side beams of the main frame of the machine that they extend beyond the said side beams outwardly, as is best shown in Figs. 1 and 3. The central portion of the segmental frames is placed approximately over the central portion of the main frame of the machine; and transversely across the center of the main frame a shaft 16, is journaled in suitable bearings, the bearings being best shown in Fig. 3, and being designated as 18. The outer ends of the shaft have secured thereon ratchet wheels 19, and one of these ratchet wheels is held to turn beneath and within each segmental frame 15. Upon the central portion of the shaft 16, that is, between the side beams of the main frame, a drum 20, is securely fastened, and upon this drum a rope or chain 21, to be used in drawing a stump, is secured. The rope or chain may be attached in any suitable manner upon the drum, and may be made to wind thereon; that is to say, the slack of the chain may be wholly taken up by the drum, or, as shown in the drawings a cleat 22, may be secured upon the upper surface of the drum near one of its heads, in which event the rope or chain is attached to the drum by being passed beneath said cleat, and the slack may then be taken up either by the drum or by a person standing at the rear of the machine.

Within each segmental frame 15, between its members, a lever 23, is pivoted. This lever at its inner end or the end extending within the frame, is provided with a head 24, and over the head a spring 25, is placed, as is best shown in Fig. 2. The head of each lever is adapted for engagement with a dog 26, the dogs being fitted at one end to embrace the heads of the levers, and the portions of the dogs thus engaging are held in contact with the heads by the lever springs 25. The lower ends of the dogs are made somewhat hook-shaped for engagement with the teeth of the ratchet wheels, as the ratchet wheels are to be turned by the upward lifting movements of the dogs. Preferably the heads of the levers are made somewhat round and both ends of the dogs somewhat hook-shaped; thus each dog has virtually a hinged connection with the lever with which it is used.

Two pawls 27 are pivoted on suitable bolts, one between the members of each of the segmental frames. The pawls are adapted to be engaged with the uppermost teeth of the ratchet wheels, and prevent the said wheels from being turned save in one direction while engaged with the levers. It often happens that when the ratchet wheels are under tension, or when the pawls 27, are in firm locking engagement with the wheels, it is desirable to raise the pawls from the wheels in order that the drum 20, may be turned either in direction of the front or the rear of the machine; and in order that the pawls may thus be conveniently manipulated, a lever 28, is fulcrumed between the members of each of the segmental frames, and the said levers 28, are provided with tongues at their inner or lower ends, adapted to engage with extensions from the heads of the pawls, as shown best in Fig. 2, from which view it will be readily seen that by bearing downward upon the levers 28 the pawls may be expeditiously and conveniently disengaged from the ratchet wheels, leaving the drum free to turn in the desired direction.

At the forward end of the main frame of the machine arms 29, are usually attached, and to these arms ropes or chains 30, are secured, said ropes or chains being adapted to pass around a tree or other anchorage that may be convenient to the stump to be extracted.

In the operation of the device the levers are operated with a pump-like motion, that is, an up and down motion. When the levers are carried downward their dogs engage with the ratchet wheels and revolve them, and when the levers are carried upward the dogs slide downward to obtain purchase upon some of the lower teeth of the ratchet wheels, while the pawls hold the ratchet wheels in the position in which they are placed by the levers. The rope or chain 21, is fastened around the stump to be drawn, while the machine at its rear end is anchored to any convenient support. By working the levers up and down the ratchet wheels will be given a continuous forward movement, and the rope or chain 21 attached to the stump will either be wound entirely around the drum 20, or the drum will act to draw in the rope or chain until the stump has been pulled from the ground.

It is evident that this device is exceedingly simple, that it is durable and economic in its construction, and further that it may be expeditiously and conveniently transported from place to place. The drum may be revolved in a manner to unwind the draft rope or chain 21 by attaching to one of the ratchet wheels a handle 31, as shown in the drawings.

Having thus described my invention, I claim as new and desire to secure by Letters Patent—

1. In a stump puller, the combination, with the frame, a drum mounted upon the frame, ratchet wheels secured upon the ends of the shaft of the drum, and segmental frames secured to the sides of the main frame and extending over the said ratchet wheels, of levers pivoted upon the segmental frames exteriorly of the periphery of the ratchet wheels, dogs having virtually a hinged connection with the levers and engaging with the ratchet wheels, and pawls pivoted upon the segmental frames and engaging with the ratchet wheels, substantially as shown and described.

2. In a stump puller, the combination, with a frame, the friction roller journaled in the frame near one end, a drum also journaled in the frame parallel with the friction roller, ratchet wheels secured to the shaft of the drum, and a pull rope connected with the drum and adapted for engagement with the stump to be pulled, of segmental frames extending from the main frame over the ratchet wheels, levers pivoted in said segmental frames exteriorly of the periphery of the ratchet wheels, dogs engaging with the levers and adapted for engagement with the ratchet wheels, springs secured to the levers and adapted to hold the heads of the dogs against the ends of the levers, pawls pivoted in the segmental frames and also engaging with the ratchet wheels, and anchorage devices connected with the main frame, as and for the purpose set forth.

3. In a stump puller, the combination, with a main frame, a drum mounted upon the frame, and ratchet wheels mounted on the ends of the shaft of the drum, of segmental frames secured to the main frame and carried upward over the ratchet wheels, levers fulcrumed in said segmental frames exteriorly of the periphery of the ratchet wheels, dogs engaging with the levers and with the ratchet wheels, springs secured to the levers and adapted to hold the heads of the dogs against the ends of the levers, pawls, also pivoted upon the segmental frames and held in engagement with the ratchet wheels, and levers engaging with the head portion of the said pawls, whereby the pawls may be raised even under tension, substantially as shown and described.

THOMAS A. TERRELL.

Witnesses:
 O. B. BARBO,
 C. E. FARRAR.